United States Patent
Sarby

(10) Patent No.: US 8,904,788 B2
(45) Date of Patent: Dec. 9, 2014

(54) ARRANGEMENT FOR INJECTING A REDUCTANT INTO AN EXHAUST LINE OF AN INTERNAL COMBUSTION ENGINE

(75) Inventor: Håkan Sarby, Huddinge (SE)

(73) Assignee: Scania CV AB (SE)

( * ) Notice: Subject to any disclaimer, the term of this patent is extended or adjusted under 35 U.S.C. 154(b) by 95 days.

(21) Appl. No.: 13/814,767

(22) PCT Filed: Jul. 11, 2011

(86) PCT No.: PCT/SE2011/050937
§ 371 (c)(1),
(2), (4) Date: Apr. 2, 2013

(87) PCT Pub. No.: WO2012/021102
PCT Pub. Date: Feb. 16, 2012

(65) Prior Publication Data
US 2013/0186086 A1 Jul. 25, 2013

(30) Foreign Application Priority Data
Aug. 13, 2010 (SE) ...................................... 1050854

(51) Int. Cl.
*F02G 3/00* (2006.01)
*F02B 33/44* (2006.01)
(Continued)

(52) U.S. Cl.
CPC ................ *F01N 5/04* (2013.01); *Y02T 10/144* (2013.01); *Y02T 10/16* (2013.01); *F02B 37/18* (2013.01); *F01N 2610/102* (2013.01);
(Continued)

(58) Field of Classification Search
CPC ...... F02B 37/004; F02B 37/18; F02B 37/013; F01N 3/2066; F01N 3/208; F01N 3/2073; F01N 2240/40; F01N 2560/06

USPC ........... 60/614, 612, 298, 299, 286, 295, 301; 123/562; 423/213.7
See application file for complete search history.

(56) References Cited

U.S. PATENT DOCUMENTS 8,153,072 B2 * 4/2012 Klingberg ........................ 60/301
8,176,731 B2 * 5/2012 Doring et al. .................... 60/301
(Continued)

FOREIGN PATENT DOCUMENTS

DE 10 2008 017280 A1 11/2009
DE 102011005654 * 9/2012 ................ F01N 3/10
(Continued)

OTHER PUBLICATIONS

Machine generated translation of DE 102011005654 A1 (see attached), published on Sep. 20, 2012.*
(Continued)

*Primary Examiner* — Thai Ba Trieu
*Assistant Examiner* — Ngoc T Nguyen
(74) *Attorney, Agent, or Firm* — Ostrolenk Faber LLP

(57) ABSTRACT

An arrangement for injecting a reducing agent into an exhaust line of a combustion engine (1). An exhaust line (3) leads exhaust gases from the engine. A first turbine (4) is in the exhaust line (3). A second turbine (20) in the exhaust line is downstream of the first turbine (4) in the intended direction of flow in the exhaust line. An injector (19) injects reducing agent into the exhaust line (3) so that it is warmed and vaporized by the warm exhaust gases in the exhaust line (3), and an SCR catalyst (29). The injector (19) is in the exhaust line downstream of the first turbine (4) and upstream of the second turbine (20).

8 Claims, 1 Drawing Sheet

(51) Int. Cl.
*F01N 3/00* (2006.01)
*F01N 3/10* (2006.01)
*F02B 33/00* (2006.01)
*F01N 3/20* (2006.01)
*F02B 37/00* (2006.01)
*F01N 5/04* (2006.01)
*F02B 37/18* (2006.01)
*F02B 41/10* (2006.01)

(52) U.S. Cl.
CPC .............. *Y02T 10/24* (2013.01); *F01N 3/2073* (2013.01); *F02B 41/10* (2013.01); *F01N 3/208* (2013.01); *F01N 2340/06* (2013.01); *F01N 3/2066* (2013.01); *F01N 2240/40* (2013.01); *F01N 2610/02* (2013.01); *F02B 37/004* (2013.01); *F01N 2900/0416* (2013.01); *F01N 2560/14* (2013.01); *F01N 2900/1404* (2013.01); *F01N 2560/06* (2013.01)
USPC .................. 60/614; 60/612; 60/295; 60/301; 60/286; 123/562

(56) References Cited

U.S. PATENT DOCUMENTS

2012/0294786 A1* 11/2012 Osumi ..................... 423/213.7
2012/0315204 A1* 12/2012 Osumi ..................... 423/213.7
2013/0269327 A1* 10/2013 Keppeler ..................... 60/301

FOREIGN PATENT DOCUMENTS

| EP | 1 903 197 A2 | 3/2008 | |
|---|---|---|---|
| EP | 2280155 B1 * | 3/2014 | ............... F01N 3/20 |
| JP | 1-162051 | 10/1989 | |
| JP | 2-94332 | 7/1990 | |
| JP | 2009-036150 | 2/2009 | |
| JP | 2010-059846 | 3/2010 | |
| JP | 2010-112314 | 5/2010 | |
| JP | 2010-121521 | 6/2010 | |
| WO | WO 2007/069994 A1 | 6/2007 | |
| WO | WO 2008/142324 A1 | 11/2008 | |
| WO | WO 2010/108574 A1 | 9/2010 | |

OTHER PUBLICATIONS

International Search Report dated Nov. 18, 2011 issued in corresponding International patent application No. PCT/SE2011/050937.
International Preliminary Report on Patentability dated Sep. 27, 2012 issued in corresponding International Patent Application No. PCT/SE2011/050937.
Japanese Office Action, dated Apr. 8, 2014, issued in corresponding Japanese Patent Application No. 2013-524062. English Translation. Total 3 pages.

* cited by examiner

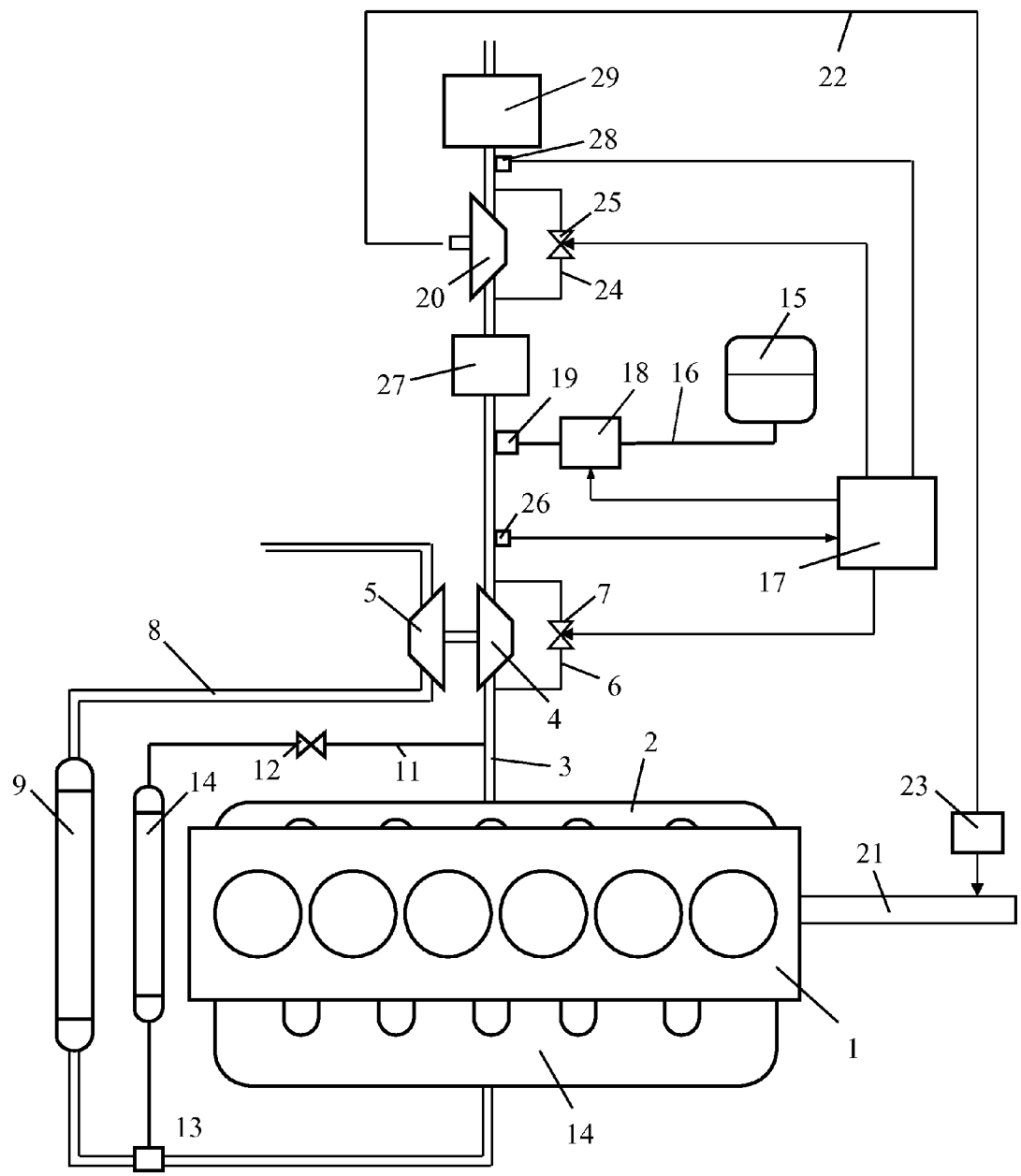

ARRANGEMENT FOR INJECTING A REDUCTANT INTO AN EXHAUST LINE OF AN INTERNAL COMBUSTION ENGINE

CROSS-REFERENCE TO RELATED APPLICATIONS

The present application is a 35 U.S.C. §§371 national phase conversion of PCT/SE2011/050937, filed Jul. 11, 2011, which claims priority of Swedish Application No. 1050854-7, filed Aug. 13, 2010, the contents of which are incorporated by reference herein. The PCT International Application was published in the English language.

BACKGROUND TO THE INVENTION AND PRIOR ART

The invention relates to an arrangement for injecting a reducing agent into an exhaust line of a combustion engine.

Today, many combustion engines and the majority of diesel engines are provided with a turbo unit. A turbo unit comprises an exhaust-powered turbine driving a compressor which compresses air in an inlet line to the engine. Air is thus supplied at a positive pressure to the engine's combustion spaces. A large amount of air and fuel can thus be supplied to and burnt in the engine. An engine with turbo can therefore produce a significantly higher power output than a similar engine with no turbo. The amount of power which the turbine can extract from the exhaust gases in order to drive the compressor is substantially related to the pressure drop of the exhaust gases across the turbine.

One way of reducing emissions of nitrogen oxides from diesel engines is to use a technique called SCR (selective catalytic reduction). This involves a reducing agent in the form of a urea solution being supplied in a specific dose to the exhaust gases in the exhaust line of a diesel engine. When the urea solution is sprayed into the exhaust line, the resulting finely divided solution becomes vaporised by contact with the hot exhaust gases so that ammonia is formed. The mixture of ammonia and exhaust gases is then led through an SCR catalyst in which the nitrogen in the nitrogen oxides in the exhaust gases reacts with the nitrogen in the ammonia to form nitrogen gas. The oxygen in the nitrogen oxides reacts with the hydrogen in the ammonia to form water. The nitrogen oxides in the exhaust gases are thus reduced in the catalyst to nitrogen gas and water vapour. With correct dosage of urea, the engine's emissions of nitrogen oxides can be greatly reduced.

Vehicles powered by a so-called turbo compound engine have an extra turbine in the exhaust line downstream of the turbine of the turbo unit. The extra turbine likewise extracts energy from the exhaust gases. This energy is used to provide the vehicle with extra power. The turbine transmits the energy extracted to a driveshaft of the engine via a transmission which may comprise a viscoclutch. A turbo compound engine therefore has a somewhat higher efficiency than a similar turbo engine. The exhaust line of a turbo compound engine thus comprises two turbines. The temperature and pressure of the exhaust gases are thus reduced in two stages in the exhaust line. In certain operating situations, the temperature of the exhaust gases downstream of the second turbine is not high enough to vaporise the urea solution injected into the exhaust line.

SUMMARY OF THE INVENTION

The object of the present invention is to propose an arrangement in a combustion engine which has an exhaust line with two turbines whereby vaporisation of a reducing agent is made possible in substantially all operating states.

This object is achieved with an arrangement of the invention. According to the present invention, the reducing agent is thus injected into the exhaust line at a location downstream of the first turbine and upstream of the second turbine. When exhaust gases expand in a turbine, they undergo a pressure drop and a temperature drop. In this case the exhaust gases thus undergo only one step of temperature lowering in the first turbine before the reducing agent is injected into the exhaust line. Thus in substantially all operating states the exhaust gases will be at a high enough temperature to vaporise the reducing agent injected into the exhaust line. The reducing agent is with advantage injected into the exhaust line by an injection means in a finely divided state such that it is quickly warmed and vaporised by the hot exhaust gases in the exhaust line. The vaporisation of the reducing agent results with advantage in the formation of ammonia which eliminates the nitrogen oxides in the downstream SCR catalyst.

There are further advantages in injecting the reducing agent upstream of the second turbine. The energy content of the exhaust gases is related to their pressure and temperature. With one turbine it is possible to utilise the energy content in the pressure of the exhaust gases. The vaporisation entails the reducing agent changing to gaseous form. As substances in gaseous form occupy a larger volume than in liquid form, the vaporisation process results in a pressure increase in the exhaust line upstream of the second turbine. A larger pressure drop can therefore be utilised to drive the second turbine in the exhaust line. A further advantage of adding the reducing agent upstream of the second turbine is that the rotating turbine can be used to mix ammonia and exhaust gases. A substantially homogenous mixture of, for example, ammonia and the exhaust gases is thus formed in an effective way without any extra components. Supplying the reducing agent upstream of the second turbine instead of downstream of it may in most cases be done at relatively small cost.

According to a preferred embodiment of the present invention the arrangement comprises a hydrolysis catalyst in the exhaust line at a location downstream of the injection means. Urea solution with the trade name AdBlue comprises 32.5% urea and a remaining portion of water. Vaporisation of AdBlue results in the formation of ammonia, isocyanic acid and water vapour. In a hydrolysis catalyst the isocyanic acid reacts with water so that ammonia is formed. The hydrocatalyst may be situated in the exhaust line at a location upstream of the second turbine. The isocyanic acid is thus converted to ammonia in the exhaust line upstream of the second turbine. Ammonia and exhaust gases may thus already in the second turbine form a substantially homogenous mixture. The SCR catalyst may be situated in the exhaust line at a location relatively near to the second turbine.

According to another embodiment of the present invention, the arrangement comprises a control unit adapted to controlling the amount of urea solution injected in the exhaust line. The control unit may use information about specific engine parameters to calculate the amount of reducing agent which needs to be added for optimum reduction of the nitrogen oxides content of the exhaust gases. The control unit may be a computer or the like provided with suitable software for this purpose. The arrangement comprises a first temperature sensor adapted to detecting the temperature of the exhaust gases in the exhaust line at a location downstream of the first turbine and upstream of the second turbine. This temperature sensor thus detects the temperature of the exhaust gases near to the location where the urea solution is injected. On the basis of this information the control unit can decide whether the exhaust gases are at a high enough temperature to vaporise the calculated amount of reducing agent.

According to another embodiment of the present invention, the exhaust line comprises a first bypass line with a first valve via which it is possible to lead exhaust gases past the first turbine. In many cases there will already be an existing such bypass line with valve (wastegate) close to turbines. To ensure that a turbine does not become overloaded, a conventional such valve allows part of the exhaust gases to pass through the bypass line when the load on the turbine becomes too great. In this case the control unit may be adapted to receiving information from the first temperature sensor about the temperature of the exhaust gases and may open the first valve so that exhaust gases are led past the first turbine at times when the exhaust gases are at too low a temperature to vaporise the urea solution. The valve may be opened so that a specific portion of the exhaust gases is led past the first turbine. It is thus possible to achieve a higher exhaust temperature in the exhaust line in the region where the urea solution is injected. Such a valve makes it possible substantially continually for the exhaust gases to reach a temperature at which it is possible to vaporise the urea solution injected into the exhaust line.

According to another preferred embodiment of the present invention, the arrangement comprises a second temperature sensor adapted to monitoring the temperature of the exhaust gases in the exhaust line at a location downstream of the second turbine, and a second bypass line with a second valve via which it is possible to lead exhaust gases past the second turbine, and the control unit is adapted to receiving information from the second temperature sensor and to opening the second valve so that exhaust gases are led past the second turbine at times when they are at too low a temperature for advantageous reduction of nitrogen oxides in the SCR catalyst to be possible. For optimum functioning of an SCR catalyst, the exhaust gases have to be at above a lowest acceptable temperature. The exhaust gases which reach the SCR catalyst undergo a first temperature drop when they expand through the first turbine, a second temperature drop when they are used to vaporise the urea solution, and a third temperature drop when they expand through the second turbine. There is always a risk that the exhaust gases reaching the SCR catalyst might be cooled to below the lowest acceptable temperature. If it receives information from the second temperature sensor that this is about to take place, the control unit opens the second valve so that at least part of the exhaust gases is led through the second bypass line and thus past the second turbine. This makes it possible for the temperature of the exhaust gases to be raised to a level such that desired elimination of nitrogen oxides can take place in the SCR catalyst.

According to another preferred embodiment, the first turbine is connected to a compressor which compresses air which is led to the combustion engine. Today, diesel engines of heavy vehicles are substantially always provided with a turbo unit. The pressure of the exhaust gases can therefore be utilised to compress air which is led to the engine. A large amount of air and fuel can thus be supplied to and burnt in the engine. The second turbine may be connected to a shaft of the engine via a transmission, in which case the pressure of the exhaust gases will be utilised by being absorbed in the second turbine to provide the vehicle with extra power. This type of engine is usually called a turbo compound engine.

BRIEF DESCRIPTION OF THE DRAWINGS

A preferred embodiment of the invention is described below by way of example with reference to the attached drawing, in which:

FIG. 1 depicts an arrangement for injecting a urea solution into an exhaust line of a combustion engine according to an embodiment of the present invention.

DETAILED DESCRIPTION OF A PREFERRED EMBODIMENT OF THE INVENTION

FIG. 1 depicts a combustion engine in the form of a diesel engine 1. The engine 1 may be intended to power a heavy vehicle. The exhaust gases from the cylinders of the engine 1 are led via an exhaust manifold 2 to an exhaust line 3. The exhaust line 3 is provided with a turbo unit which comprises a turbine 4 and a compressor 5. The turbine 4 is intended to convert the energy of the exhaust gases in the exhaust line 3 to mechanical work for driving the compressor 5. A bypass line 6 extends round the turbine. By means of a valve 7, exhaust gases can be led through the bypass line 6 and thus past the turbine. The compressor 5 is intended to compress air which is led into an inlet line 8 to the diesel engine 1. A charge air cooler 9 is provided in the inlet line 8 to cool the compressed air. The engine 1 comprises a return line 11 for recirculation of exhaust gases. An EGR valve 12 is adapted to regulating the amount of exhaust gases which is led through the return line 11 from the exhaust line 3 to the inlet line 8 in which the recirculating exhaust gases are mixed with the air by, for example, a mixing means 13. The recirculating exhaust gases are cooled in at least one EGR cooler 14 in the return line 11 before they are mixed with the air in the air line 8. The mixture of air and exhaust gases is led to the respective combustion spaces of the engine 1 via a manifold 14.

The exhaust line 3 is here provided with catalytic exhaust cleaning by the method known as SCR (selective catalytic reduction). This involves supplying a reducing agent in the form of a urea solution to the exhaust gases in the engine's exhaust line 3. The urea solution is stored in a tank 15 and is led to the exhaust line 3 via a line 16. A control unit 17, which may be a computer unit with suitable software, controls the supply of urea solution by activation of a pump 18. The pump 18 conveys urea solution to an injection means 19 which injects it into the exhaust line 3. An undepicted compressed air source may be connected to the injection means 19 to boost the injection process. The control unit 17 may use information about specific engine parameters to calculate the amount of urea solution which needs to be added for optimum reduction of the nitrogen oxides content of the exhaust gases. The solution supplied is intended to be heated by the exhaust gases in the exhaust line 3 so that it becomes vaporised.

The urea solution is supplied at a location downstream of the turbo unit's turbine 4 and upstream of an extra turbine 20 in the exhaust line 3. The extra turbine 20 is connected to an output shaft 21 of the engine 1 by a schematically depicted transmission 22 which comprises a viscoclutch 23. The expansion through the extra turbine 20 of the exhaust gases in the exhaust line 3 results in the extraction of energy from them which is transferred via said transmission 22 to serve as extra driving power for the output shaft 21. A bypass line 24 extends round the extra turbine 20. By means of a valve 25 exhaust gases can be led through the bypass line 24 and hence past the extra turbine 20. A temperature sensor 26 detects the temperature of the exhaust gases in the exhaust line 3 at a location downstream of the turbine 4 and upstream of the extra turbine 20. A hydrolysis catalyst 27 is situated in the exhaust line 3 at a location relatively near to the injection means 19 which injects the urea solution. The hydrocatalyst is situated in the exhaust line 3 at a location upstream of the extra turbine 20. An SCR catalyst 29 is situated in the exhaust line at a location downstream of the extra turbine 20. A temperature sensor 28 is provided in the exhaust line 3 to monitor the temperature of the exhaust gases at a location downstream of the second turbine 20 and upstream of the SCR catalyst 29. The temperature sensor 28 thus monitors the temperature of the exhaust gases before they are led into the SCR catalyst 29.

During operation of the engine 1, the control unit 17 substantially continuously receives information about engine parameters such as fuel, exhaust flow etc. On the basis of such information the control unit 17 can calculate the amount of urea solution which needs to be added for substantially optimum reduction of the nitrogen oxides content of the exhaust gases. The control unit 17 supplies the calculated amount of urea solution by means of the pump 18 which conveys it from the tank 15 to the injection means 19 via the line 16. The injection means 19 injects the calculated amount of solution in finely divided form into the exhaust line at a suitable mixing distance upstream of the extra turbine 20. The length of the mixing distance is such that the solution supplied can all become vaporised before it reaches the extra turbine 20. The finely divided solution is usually warmed quickly and vaporised by the hot exhaust gases in the exhaust line 3. The vaporised solution forms initially ammonia, isocyanic acid and water vapour. In the hydrolysis catalyst 27 the isocyanic acid reacts with water vapour so that further ammonia is formed. Substantially a mixture of exhaust gases, ammonia and water vapour is consequently led to the extra turbine 20.

When the urea solution becomes vaporised it occupies a larger volume than in liquid form. This results in the pressure increasing in the exhaust line 3 upstream of the extra turbine 20. This pressure increase upstream of the extra turbine 20 leads to the possibility of utilising a larger pressure drop to drive the extra turbine 20. The driving power transferred from the extra turbine 20 to the output shaft 21 therefore increases accordingly. The ammonia and exhaust gases undergo effective stirring in the extra turbine 20. This results in a substantially homogeneous mixture of ammonia and exhaust gases in the exhaust line 3 substantially immediately downstream of the extra turbine 20. The SCR catalyst 29 may therefore be situated relatively near to the extra turbine 20 in the exhaust line 3. The mixture of ammonia and exhaust gases is led through the SCR catalyst 29, in which the nitrogen in the nitrogen oxides in the exhaust gases reacts with the nitrogen in the ammonia, resulting in the formation of nitrogen gas. The oxygen in the nitrogen oxides reacts with the hydrogen in the ammonia, resulting in the formation of water. The nitrogen oxides in the exhaust gases are thus reduced in the SCR catalyst 29 to nitrogen gas and water vapour. With correct dosage of the urea solution the discharge of nitrogen oxides from the engine 1 can be largely reduced.

During operation of the engine 1, the control unit 17 receives information from the temperature sensor 26. If the sensor 26 indicates that the exhaust gases are at too low a temperature to vaporise the urea solution in the exhaust line, the control unit 17 opens the valve 7 so that at least part of the exhaust gases in the exhaust line 3 is led past the turbine 4. These exhaust gases therefore undergo no lowering of temperature in the turbine 4. The exhaust gases may therefore in substantially all operating states be at a high enough temperature to vaporise the urea solution injected into the exhaust line 3. During operation of the engine 1, the control unit 17 receives also information from the temperature sensor 28. If the sensor 28 indicates that the exhaust gases led to the SCR catalyst 29 are at too low a temperature, the control unit 17 opens the valve 25 so that at least part of the exhaust gases in the exhaust line 3 is led through the bypass line 24 and thus past the extra turbine 20. These exhaust gases therefore undergo no lowering of temperature in the extra turbine 20. The exhaust gases may thus in substantially all operating situations be at a high enough temperature to enable the chemical reactions in the SCR catalyst to take place in a desired way. At times when the exhaust gases are at a very low temperature, the control unit 17 may open both of the valves 7, 25. This makes it possible to maintain an exhaust temperature which both vaporises the urea solution at a location in the exhaust line 3 between the turbines 7 and 20 and makes possible a desired function of the SCR catalyst downstream of the extra turbine 20.

The invention is not restricted to the embodiment described above but may be varied freely within the scopes of the claims.

The invention claimed is:

1. An arrangement for injecting a reducing agent into an exhaust line of a combustion engine, the arrangement comprising:
    an exhaust line connected with the engine for leading exhaust gases out from the engine;
    a first turbine situated in the exhaust line;
    a second turbine situated in the exhaust line at a location downstream of the first turbine with respect to the direction of flow in the exhaust line;
    an injector connected for injecting the reducing agent into the exhaust line where the reducing agent is warmed and vaporized by warm exhaust gases in the exhaust line so that ammonia is formed by the exhaust gases and the reducing agent; the injector situated in the exhaust line at a location downstream of the first turbine and upstream of the second turbine with respect to the direction of flow in the exhaust line;
    an SCR catalyst situated downstream of the second turbine in which nitrogen oxides in the exhaust gases is reduced by the ammonia formed in the exhaust line;
    a hydrolysis catalyst situated at a location downstream of the injector and upstream of the second turbine in the exhaust line;
    a temperature sensor situated in the exhaust line at a location downstream of the second turbine configured for monitoring the temperature of the exhaust gases of the second turbine;
    a bypass line extending from upstream to downstream of the second turbine having a valve configured to lead exhaust gases past the second turbine; and
    a control unit configured and operable to receive information from the temperature sensor and to open the valve of the bypass line extending from upstream to downstream of the second turbine so that exhaust gases are led past the second turbine at times when they are at too low a temperature for advantageous reduction of nitrogen oxides to take place in the SCR catalyst.

2. An arrangement according to claim 1, wherein reducing agent is a urea solution.

3. An arrangement according to claim 1, wherein the control unit is configured for controlling the amount of reducing agent injected into the exhaust line.

4. An arrangement according to claim 3, wherein the control unit receives information about the temperature of the exhaust gases from the temperature sensor downstream of the first turbine and upstream of the second turbine and selectively opens the valve of bypass line extending from upstream to downstream of the first turbine to lead exhaust gases past the first turbine when the exhaust gases are at too low a temperature in the exhaust line to vaporize the reducing agent.

5. An arrangement according to claim 1, further comprising another temperature sensor situated in the exhaust line at a location downstream of the first turbine and upstream of the second turbine configured for monitoring the temperature of the exhaust gases downstream of the first turbine and upstream of the second turbine and for communicating with the control unit for affecting the amount of reducing agent injected into the exhaust line before the second turbine.

6. An arrangement according to claim 1, wherein the exhaust line further comprises another bypass line extending from upstream to downstream of the first turbine having a valve for selectively leading exhaust gases past the first turbine or for leading exhaust gases through the first turbine.

7. An arrangement according to claim 1, wherein the first turbine is connected to a compressor configured to compress air which is then led to the engine.

8. An arrangement according to claim 1, further comprising a shaft of the engine and a transmission connecting the second turbine to the shaft of the engine.

* * * * *